United States Patent [19]

Baillargeon et al.

[11] Patent Number: 5,000,758
[45] Date of Patent: Mar. 19, 1991

[54] MULTIFUNCTIONAL FUEL ADDITIVES DERIVED FROM AMINODIOLS TO IMPROVE THE LOW-TEMPERATURE PROPERTIES OF DISTILLATE FUELS

[75] Inventors: David J. Baillargeon, West Windsor Township, Middlesex County; Angeline B. Cardis, Florence; Dale B. Heck, West Deptford, all of N.J.

[73] Assignee: Mobil Oil Corp., Fairfax, Va.

[21] Appl. No.: 449,173

[22] Filed: Dec. 13, 1989

[51] Int. Cl.$^5$ .............................................. C10L 1/14
[52] U.S. Cl. .................................. 44/399; 525/419; 564/134; 564/144; 564/169
[58] Field of Search .................. 44/62, 72, 71, 75, 78, 44/63; 525/419; 564/134, 144, 169

[56] References Cited

U.S. PATENT DOCUMENTS

| | | | |
|---|---|---|---|
| 2,594,145 | 4/1952 | Flory | 525/420 |
| 3,397,255 | 8/1968 | Coats et al. | 525/437 |
| 3,882,085 | 5/1975 | Schmitt et al. | 525/420 |
| 4,061,621 | 12/1977 | Lofquist | 525/420 |
| 4,236,898 | 12/1980 | Davis et al. | 44/72 |
| 4,290,778 | 9/1981 | Herbstman et al. | 44/71 |
| 4,328,142 | 5/1982 | Hertel et al. | 525/420 |
| 4,402,708 | 9/1983 | Oswald | 44/62 |
| 4,404,001 | 9/1983 | Kaufman | 44/71 |
| 4,430,093 | 2/1984 | Jenkins, Jr. | 44/70 |
| 4,659,337 | 4/1987 | Sung | 44/71 |
| 4,690,980 | 9/1987 | Singer et al. | 525/286 |
| 4,732,948 | 3/1988 | McCready et al. | 525/437 |
| 4,744,798 | 5/1988 | Andress | 44/63 |

Primary Examiner—Margaret B. Medley
Attorney, Agent, or Firm—Alexander J. McKillop; Charles J. Speciale; Howard M. Flournoy

[57] ABSTRACT

Additives comprising the reaction products of aminodiols and the products of benzophenone tetracarboxylic dianhydride and aminoalcohols and/or amines with long-chain hydrocarbyl groups attached improve the low-temperature properties of distillate fuels.

43 Claims, No Drawings

MULTIFUNCTIONAL FUEL ADDITIVES DERIVED FROM AMINODIOLS TO IMPROVE THE LOW-TEMPERATURE PROPERTIES OF DISTILLATE FUELS

BACKGROUND OF THE INVENTION

This application is directed to multifunctional additives which improve the low temperature properties of distillate fuels and to fuel compositions containing minor amounts thereof.

Traditionally, the low-temperature properties of distillate fuels have been improved by the addition of kerosene, sometimes in very large amounts (5-70 wt %). The kerosene dilutes the wax in the fuel, i.e. lowers the overall weight fraction of wax, and thereby lowers the cloud point, filterability temperature, and pour point simultaneously. The additives of this invention effectively lower both the cloud point and CFPP (Cold Filter Plugging Point) of distillate fuel without any appreciable dilution of the wax component of the fuel.

Other additives known in the art have been used in lieu of kerosene to improve the low-temperature properties of distillate fuels. Many such additives are polymeric materials with pendant fatty hydrocarbon groups. These additives are limited in the range of their activity, however; most improve fuel properties by lowering the pour point and/or filterability temperature. These additives have little or no effect on the cloud point of the fuel.

No art is known to applicants which teaches or suggest the additive products and compositions of this invention. However, U.S. Pat. Nos. 3,910,987 and 3,910,981 disclose the use of certain aminodiols in the preparation of petroleum additives.

The additives of this invention are substantially different, however, both in terms of structure and function. They are oligomeric and/or polymeric materials obtained via condensation reactions, e.g. the reaction of aminodiols with acids and/or anhydrides. In terms of activity, these additives effectively lower distillate fuel cloud point, thus providing improved low-temperature fuel properties, and offering a unidque and useful advantage over known distillate fuel additives.

These new additives are especially effective in lowering the cloud point of distillate fuels, and thus improve the low-temperature flow properties of such fuels without the use of any light hydrocarbon diluent, such as kerosene. In addition, the filterability properties are improved as demonstrated by lower CFPP temperatures. Thus, the additives of this invention demonstrate multifunctional activity in distillate fuels.

SUMMARY OF THE INVENTION

This application is directed to novel oligomeric/polymeric benzophenone tetracarboxylate esters and ester/amides which have been found to be surprisingly active wax crystal modifier additives for distillate fuels. Distillate fuel compositions containing minor amounts of such additives demonstrate significantly improved low-temperature flow properties, with lower cloud point and lower CFPP (Cold Filter Plugging Point) filterability temperature.

These oligomeric/polymeric additives are the reaction products derived from two types of monomer components. The first monomer type is an aminodiol, either alone or in combination with other aminodiols. The second monomer type is a reactive acid/anhydride product, either alone or in combination with other such monomers, derived from the reaction of benzophenone tetracarboxylic dianhydride (BTDA) with either (a) an aminoalcohol, the product of an amine and an epoxide, or (b) a combination of an aminoalcohol (a) and an amine.

The additive compositions, described in this application are unique in structure and activity. The additive concentrates and fuel compositions containing such additives are also unique. Similarly, the processes for making these additives, additive concentrates, and fuel compositions are unique.

DESCRIPTION OF SPECIFIC EMBODIMENTS

The additives of this invention have oligomeric (i.e. dimers trimers, etc.) and/or polymeric structures. Various hydrocarbyl groups, especially groups containing linear paraffinic substructures, are distributed along the backbone of the oligomer and/or polymer, and may be carried by either or both of the comonomers used.

The additives of this invention are the reaction products obtained by combining the two monomer types described in differing ratios using standard esterification techniques according to the following stepwise procedure:

1. BTDA + 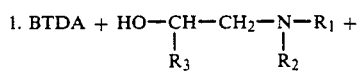

optionally 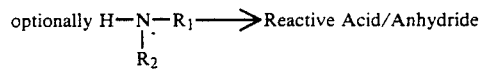 Reactive Acid/Anhydride

2. Reactive Acid/Anhydride + 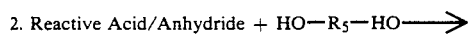

Oligomer/Polymer

Where HO-$R_5$-OH = aminodiol(s) as described herein and $R_1$, $R_2$ and $R_3$ are as described hereinbelow and $R_5$ is the amine containing hydrocarbyl sub-structure of said aminodiol(s).

One of the comonomers as stated hereinabove, alone or in combination, used in the synthesis of these additives is an aminodiol. Any aminodiol may be used in this invention and may include, but is not limited by, examples given below.

On class of aminodiols are those diols derived fom the reaction of a primary amine with two or more equivalents of an epoxide:

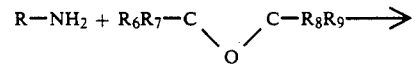

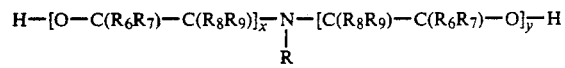

Where
$x + y \geq 2$
$R = C_1$ to about $C_{100}$ hydrocarbyl, or $C_1$ to about $C_{100}$ hydrocarbyl containing phosphorus, nitrogen, sulfur and/or oxygen
$R_6$, $R_7$, $R_8$, $R_9$ = hydrogen, $C_1$ to about $C_{100}$ hydrocarbyl containing phosphorus, nitrogen, sulfur and/or oxygen A second class of aminodiols are those diols derived from the reaction of a bis-secondary amine with two or more equivalents of an epoxide:

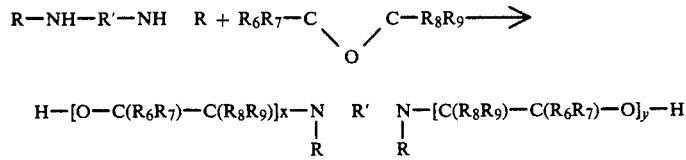

Where
$x + y \geq 2$

R, R' = $C_1$ to about $C_{100}$ hydrocarbyl, or $C_1$ to about $C_{100}$ hydrocarbyl containing phosphorus, nitrogen, sulfur and/or oxygen $R_6$, $R_7$, $R_8$, $R_9$ = hydrogen, $C_1$ to about $C_{100}$ hydrocarbyl, or hydrocarbyl containing phosphorus, nitrogen, sulfur and/or oxygen The other comonomer, alone or in combination, used in the synthesis of these additives is a reactive acid and/or anhydride derived from the reaction of benzophenone tetracarboxylic dianhydride (BTDA) or its acid equivalent, and suitable pendant groups derived from alcohols and amines with some combination of linear hydrocarbyl groups attached. These pendant groups include (a) aminoalcohols, derived from a secondary amine capped with an olefin epoxide, (b) combinations of the aminoalcohol from (a) and an amine, and (c) combinations of two or more different aminoalcohols. These pendant groups usually contain from 30 to about 100 carbon atoms or more.

A general structure, for example, for oligomers/polymers derived from BTDA partial ester and aminodiol is as follows:

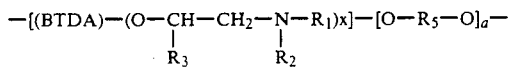

A general structure fo oligomers/polymers derived from BTDA mixed partial ester and aminodiol is an follows:

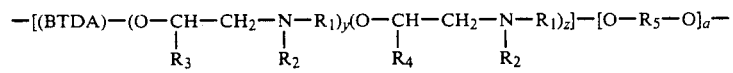

A general structure for oligomers/polymers derived from BTDA partial ester/amide and aminodiol is as follows:

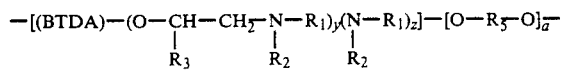

where:
$x = y + z = 0.5$ to about 3.5 and preferably from 1 to 3.
$a = 0.25$ to about 2, and preferably from 0.5 to 1.25.
$R_1$, $R_3$ = $C_8$ to about $C_{50}$ linear hydrocarbyl groups, either saturated or unsaturated.
$R_2 = R_1$, $C_1$ to about $C_{100}$ hydrocarbyl, or hydrocarbyl containing phosphorus, nitrogen, sulfur and/or oxygen.
$R_4$ = hydrogen, $C_1$ to about $C_{100}$ hydrocarbyl, or hydrocarbyl containing phosphorus, nitrogen, sulfur and/or oxygen.
$R_5$ = amine-containing $C_1$ to about $C_{100}$ hydrocarbyl sub-structure of the aminodiol(s) defined above.

In a one-pot synthesis process the aminodiol is first prepared by suitably reacting an amine or mixture of amines with an epoxide or mixture thereof and then reacting the resultant product with BTDA or its acid equivalent.

Examples of the amines include hydrogenated tallow amine, n-octylamine, piperazine and/or mixtures thereof.

Included within the scope of the epoxides as set forth above, are ethylene oxide, 1,2-epoxydecane, 1,2-epoxydodecane, 1,2-epoxytetradecane, 1,2-epoxypentadecane, 1,2-epoxyhexadecane, 1,2-epoxyheptadecane, 1,2-epoxyoctadecane, 1,2-epoxyeicosane and mixtures thereof. Especially preferred is 1,2-epoxyoctadecane and ethylene oxide.

The conditions for the BTDA intermediate aminodiol reaction may also vary widely with temperatures varying from 100° to about 250° C.

The reactions can be carried out under widely varying conditions. For example, the aminodiol may be prepared at temperatures varying from 80° to about 250° C.

The temperatures chosen will depend upon the particular reactants and on the solvent, if one is used. Typically hydrocarbon solvents such as xylene will be used. However, any non-reactive solvent including benzene, toluene or mixutres thereof can be used.

Molar ratios, less than molar ratios or more than molar ratios of the reactants can be used. Preferentially a molar ratio of 1:1 of epoxide to amine is choosen. Molar ratios of aminodiol to BTDA intermediate may vary from 1:3 to about 2:1 and preferentially 1:1 to about 1.25:1.

In general, the reaction products of the present invention may be employed in any amount effective for imparting the desired degree of activity necessary to improve the low temperature characteristics of distillate fuels. In many applications the products are effectively employed in amounts from about 0.001% to about 10% by weight and preferably from less than 0.1% to about 5% of the total weight of the composition. These additives may be used in conjunction with other known low-temperature fuel additives (dispersants, etc.) being used for their intended purpose.

The fuels contemplated are liquid hydrocarbon combustion fuels, including the distillate fuels and fuel oils. Accordingly, the fuel oils that may be improved in accordance with the present invention are hydrocarbon fractions having an initial boiling point of at least about 250° F. and an end-boiling point no higher than about 750° F. and boiling substantially continuously throughout their distillation range. Such fuel oils are generally known as distillate fuel oils. It is to be understood, however, that this term is not restricted to straight run distillate fractions. The distillate fuel oils can be straight run distillate fuel oils, catalytically or thermally cracked (including hydrocracked) distillate fuel oils, or mixtures of straight run distillate fuel oils, naphthas and the like, with cracked distillate stocks. Moreover, such fuel oils can be treated in accordance with well-known commercial methods, such as, acid or caustic treatment, hydrogenation, solvent refining, clay treatment, etc.

The distillate fuel oils are characterized by their relatively low viscosities, pour points, and the like. The principal property which characterize the contemplated hydrocarbons, however, is the distillation range. As mentioned hereinbefore, this range will lie between about 250° F. and about 750° F. Obviously, the distillation range of each individual fuel oil will cover a narrower boiling range falling, nevertheless, within the above-specified limits. Likewise, each fuel oil will boil substantially continuously throughout its distillation range.

Contemplated among the fuel oils are Nos. 1, 2 and 3 fuel oils used in heating and as diesel fuel oils, and the jet combustion fuels. The domestic fuel oils generally conform to the specification set forth in A.S.T.M. Specifications D396-48T. Specifications for diesel fuels are defined in A.S.T.M. Specification D975-48T, Typical jet fuels are defined in Military Specification MIL-F-5624B.

The following examples are illustrative only and are not intended to limit the scope of the invention.

EXAMPLES

Example 1

Preparation of Additive 1

Piperazine (1.44 g, 0.017 mol; e.g. from Aldrich Chemical Company), di(hydrogenated tallow) amine (50.0 g, 0.10 mol; e.g. Armeen 2HT from Akzo Chemie), and 1,2-epoxyoctadecane (44.8 g, 0.167 mol; e.g. Vikolox 18 from Viking Chemical) were combined and heated at 160° to 190° C. for 18 to 24 hours. Benzophenone tetracarboxylic dianhydride (11.8 g, 0.037 mol; e.g. BTDA from Allco Chemical Corporation) and xylene (approximately 50 ml) were added and heated at reflux (180° to 200° C.) with azeotropic removal of water for 24 hours. Volatiles were then removed from the reaction medium at 190° to 200° C., and the reaction mixture was hot filtered through diatomaceous earth to give 97.5 g of the final product.

Example 2

Preparation of Additive 2

According to the procedure used for Example 1, piperazine (3.45 g, 0.040 mol, di(hydrogenated tallow) amine (40.0 g, 0.080 mol), and 1,2-epoxyoctadecane (53.7 g, 0.200 mol) were combined. Then, benzophenone tetracarboxylic dianhydride (7.85 g, 0.036 mol) and xylene (approximately 50 ml) were added and allowed to react. After isolation, 105.9 g of the final product was obtained.

Example 3

Preparation of Additive 3

According to the procedure used for Example 1, n-octylamine (2.75 g, 0.017 mol; e.g. from Aldrich Chemical Company), di(hydrogenated tallow) amine (50.0 g, 0.100 mol), and 1,2-epoxyoctadecane (44.8 g, 0.167 mol) were combined. Then, benzophenone tetracarboxylic dianhydride (11.8 g, 0.037 mol) and xylene (approximately 50 ml) were added and allowed to react. After isolation, 98.2 g of the final product was obtained.

Example 4

Preparation of Additive 4

According to the procedure used for Example 1, n-octylamine (6.61 g, 0.040 mol, di(hydrogenated tallow) amine (40.0 g, 0.080 mol), and 1,2-epoxyoctadecane (64.7 g, 0.200 mol) were combined. Then, benzophenone tetracarboxylic dianhydride (14.2 g, 0.044 mol) and xylene (approximately 50 ml) were added and allowed to react. After isolation, 103.0 g of the final product was obtained.

Example 5

Preparation of Additive 5

According to the procedure used for Example 1, hydrogenated tallow amine (4.31 g, 0.017 mol; e.g. Armeen HT from Akzo Chemie), di(hydrogenated tallow) amine (50.0 g, 0.100 mol), and 1,2-epoxyoctadecane (44.8 g, 0.167 mol) were combined. Then, benzophenone tetracarboxylic dianhydride (11.8 g, 0.037 mol) and xylene (approximately 50 ml) were added and allowed to react. After isolation, 103.4 g of the final product was obtained.

Example 6

Preparation of Additive 6

According to the procedure used for Example 1, hydrogenated tallow amine (10.3 g, 0.040 mol, di(hydrogenated tallow) amine (40.0 g, 0.080 mol), and 1,2-epoxyoctadecane (53.7 g, 0.200 mol) were combined. Then, benzophenone tetracarboxylic dianhydride (14.2 g, 0.044 mol) and xylene (approximately 50 ml) were added and allowed to react. After isolation, 108.2 g of the final product was obtained.

Example 7

Preparation of Additive 7

According to the procedure used for Example 1, di(hydrogenated tallow) amine (50.0 g, 0.100 mol), and 1,2-epoxyoctadecane (33.6 g, 0.125 mol) were combined. Then, Ethomeen T/12 (8.66 g, 0.025 mol; an aminodiol derived from tallow amine and two equivalents of ethylene oxide, e.g. from Akzo Chemie), benzophenone tetracarboxylic dianhydride (17.7 g, 0.055 mol) and xylene (approximately 50 ml) were added and allowed to react. After isolation, 100.5 g of the final product was obtained.

Example 8

Preparation of Additive 8

According to the procedure used for Example 1, di(hydrogenated tallow) amine (50.0 g, 0.100 mol) and 1,2-epoxyoctadecane (33.6 g, 0.125 mol) were combined. Then, Ethomeen T/12 (18.2 g, 0.052 mol) benzophenone tetracarboxylic dianhydride (17.7 g, 0.055 mol) and xylene (approximately 50 ml) were added and allowed to react. After isolation, 109.2 g of the final product was obtained.

Example 9

Preparation of Additive 9

According to the procedure used for Example 1, di(hydrogenated tallow) amine (50.0 g, 0.100 mol), and 1,2-epoxyoctadecane (33.6 g, 0.125 mol) were combined. Then, Ethomeen T/12 (12.0 g, 0.025 mol; an aminodiol derived from tallow amine and five equivalents of ethylene oxide, e.g. from Akzo Chemie), benzophenone tetracarboxylic dianhydride (17.7 g, 0.055 mol) and xylene (approximately 50 ml) were added and allowed to react. After isolation, 89.2 g of the final product was obtained.

Example 10

Preparation of Additive 10

According to the procedure used for Example 1, di(hydrogenated tallow) amine (50.0 g, 0.100 mol) and 1,2-epoxyoctadecane (33.6 g, 0.125 mol) were combined. Then, Ethomeen T/15 (25.1 g, 0.052 mol), benzophenone tetracarboxylic dianhydride (17.7 g, 0.055 mol) and xylene (approximately 50 ml) were added and allowed to react. After isolation, 86.7 g of the final product was obtained.

Example 11

Preparation of Additive 11 n-Octylamine (5.17 g, 0.040 mol), and 1,2-epoxyoctadecane (34.2 g, 0.12 mol) were combined and were reacted together at 140° to 170° C. for 23 hours. Di(hydrogenated tallow) amine (40.8 g, 0.80 mol) was added to the reaction mixture and was heated at 170° C. for six to seven hours. Then, benzophenone tetracarboxylic dianhydride (12.9 g, 0.040 mol) and xylene (approximately 50 ml) were added and heated at reflux (190° C.) with azeotropic removal of water for 24 hours. Volatiles were then removed from the reaction medium at 190° to 200° C., and the reaction mixture was hot filtered through diatomaceous earth to give 84.8 g of the final product.

Preparation of Additive Concentrate

A concentrate solution of 100 ml total volume was prepared by dissolving 10 g of additive in mixed xylenes solvent. Any insoluble particulates in the additive concentrate were removed by filtration before use.

Test Procedures

The cloud point of the additized distillate fuel was determined using an automatic cloud point test based on the commercially available Herzog cloud point tester; the test designation is "HERZOG."

The low-temperature filterability was determined using the Cold Filter Plugging Point (CFPP) test. This test procedure is described in *Journal of the Institute of Petroleum*, Volume 52, Number 510, June 1966, pages 173 to 185.

The characteristics of test fuels Diesel Fuel A and B were as follows:

TABLE
(Test Fuel Characteristics)

|  | FUEL B | FUEL A |
|---|---|---|
| API Gravity | 34.1 | 35.5 |
| Cloud Point, °F. |  |  |
| Auto CP | 22 | 15 |
| Herzog | 23.4 | 16.4 |
| CFPP, °F. | 16 | 9 |
| Pour Point, °F. | 0 | 10 |

Test Results

Additive Effect on the Cloud Point and Filterability (CFPP) of Distillate Fuel (Additive Concentration = 0.1% Wt)

Improvement in Performance Temperature (°F.)

| Additive | Diesel Fuel A Cloud Point | | Diesel Fuel B Cloud Point | |
|---|---|---|---|---|
|  | Herzog | CFPP | Herzog | CFPP |
| 1 | 1.5 | 4 | 6.3 | 9 |
| 2 | 1.6 | 6 | 6.7 | 7 |
| 3 | 1.8 | 6 | 6.3 | 9 |
| 4 | 2.0 | 6 | 7.4 | 11 |
| 5 | 1.6 | 6 | 6.1 | 6 |
| 6 | 1.6 | 6 | 6.1 | 7 |
| 7 | 2.7 | 4 | 7.9 | 6 |
| 8 | 2.2 | 4 | 7.6 | 7 |
| 9 | 1.6 | 6 | 7.0 | 11 |
| 10 | 1.8 | 6 | 7.0 | 11 |
| 11 | 2.1 | — | 7.4 | 6 |

The test data clearly show that the additives in accordance with the invention improve the low-temperature characteristics of distillate fuels.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A product of reaction suitable for use to improve the low-temperature properties of liquid hydrocarbyl fuels made by reacting comonomers comprising (1) an aminodiol or combination or mixture of aminodiols with (2) a reactive acid/anhydride product alone or in combination with other monomers derived from the reaction of benzophenone tetracarboxylic dianhydride or its acid equivalent with (a) an aminoalcohol, the product of an amine and an epoxide by reacting under esterification conditions at temperatures varying from 80° to about 250° C. in molar ratios, less than molar ratios and more than molar ratios.

2. The product of claim 1 wherein the aminodiol has the following generalized structure:

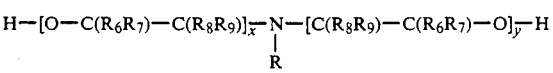

Where $x + y \geq 2$

R is $C_1$ to about $C_{100}$ hydrocarbyl, or $C_1$ to about $C_{100}$ hydrocarbyl or hydrocarbyl containing phosphorous, nitrogen, sulfur and/or oxygen $R_6$, $R_7$, $R_8$, $R_9$, = hydrogen, or $C_1$ to about $C_{100}$ hydrocarbyl or hydrocarbyl containing phosphorous, nitrogen, sulfur and/or oxygen.

3. The product of claim 1 where the aminodiol has the following generalized structure:

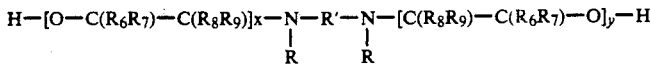

Where $x + y \geq 2$

R, R' = $C_1$ to about $C_{100}$ hydrocarbyl, or $C_1$ to about $C_{100}$ hydrocarbyl containing phosphorus, nitrogen, sulfur and/or oxygen $R_6$, $R_7$, $R_8$, $R_9$ = hydrogen, or $C_1$ to about $C_{100}$ hydrocarbyl, or hydrocarbyl containing phosphorus, nitrogen, sulfur and/or oxygen.

4. The product of claim 2 wherein the aminodiol is derived from a primary or a bis-secondary amine or mixture thereof and an epoxide or mixtures thereof.

5. The product of claim 4 where there are two or more equivalents of epoxide per primary or bis-secondary amine.

6. The product of claim 4 wherein the aminodiol is derived from piperazine, and 1,2-epoxyoctadecane.

7. The product of claim 4 wherein the aminodiol is derived from hydrogenated tallow amine and 1,2-eopxyoctadene.

8. The product of claim 4 wherein the aminodiol is derived from n-oxtyl amine and 1,2-epoxyoctadecane.

9. The product of claim 4 wherein the aminodiol is derived from tallow amine and ethylene oxide.

10. The product of claim 1 comprising oligomers/polymers derived from benzophenone tetracarboxylic dianhydride partial ester and aminodiol having the following generalized structure:

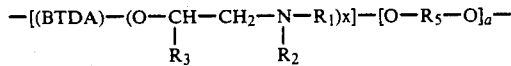

where:

$R_1$, $R_3$ = $C_8$ to about $C_{50}$ hydrocarbyl $R_2$ = $R_1$, $C_1$ to about $C_{100}$ hydrocarbyl, or $C_1$ to about $C_{100}$ hydrocarbyl containing phosphorus, nitrogen, sulfur and/or oxygen, $R_5$ = $C_8$ to about $C_{100}$ amine-containing hydrocarbyl sub-structure of said aminodiol(s), $x = 0.5$ to about 3.5, and $a = 0.25$ to about 2.

11. The product of claim 1 comprising oligomers/polymers derived from benzophenone tetracarboxylic dianhydride mixed partial ester and aminodiol having the following generalized structure:

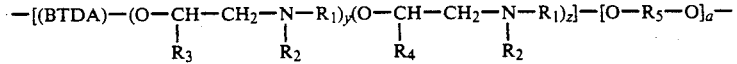

where:

$R_1$, $R_3$ = $C_8$ to about $C_{50}$ hydrocarbyl $R_2$ = $R_1$, $C_1$ to about $C_{100}$ hydrocarbyl, or $C_1$ to about $C_{100}$ hydrocarbyl containing phosphorus, nitrogen, sulfur and/or oxygen.

$R_4$ = hydrogen, $C_1$ to about $C_{100}$ hydrocarbyl, or $C_1$ to about $C_{100}$ hydrocarbyl containing phosphorus, nitrogen, sulfur and/or oxygen.

$R_5$ = amine-containing sub-structure of said aminodiol(s), $y + z = 0.5$ to about 3.5, and $a = 0.25$ to about 2.

12. The product of claim 1 comprising oligomers/polymers derived from benzophenone tetracarboxylic dianhydride partial ester/amide and aminodiol having the following generalized structure:

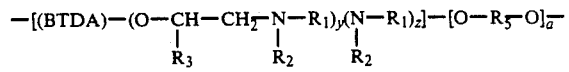

where:

$R_1$, $R_3$ = $C_8$ to about $C_{50}$ hydrocarbyl groups, $R_2$ = $R_1$, $C_1$ to about $C_{100}$ hydrocarbyl, or $C_1$ to about $C_{100}$ hydrocarbyl containing phosphorus, nitrogen, sulfur and/or oxygen.

$R_5$ = $C_1$ to about $C_{100}$ amine-containing hydrocarbyl sub-structure of said aminodiol(s), $y + z = 0.5$ to about 3.5, $a = 0.25$ to about 2.

13. A liquid hydrocarbyl fuel composition comprising a major amount of a combustible liquid hydrocarbon fuel and a minor low-temperature properties improving amount of from about 0.001% to about 10 wt % based on the total weight of the composition of an additive comprising a product of reaction made by reacting comonomers comprising (1) an aminodiol or combination or mixture of aminodiols with (2) a reactive acid-/anhydride product alone or in combination with other monomers derived from the reaction of benzophenone tetracarboxylic dianhydride or its acid equivalent with (a) an aminoalcohol, the product of an amine and an epoxide by reacting under esterification conditions at temperatures varying from 80° to about 250° C. in molar ratios, less than molar ratios and more than molar ratios.

14. The composition of claim 13 wherein said aminodiol has the following generalized structure:

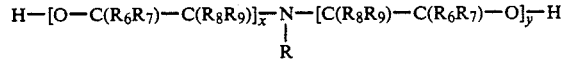

where $x + y \geq 2$

R = $C_1$ to about $C_{100}$ hydrocarbyl, or $C_1$ to about $C_{100}$ hydrocarbyl, or hydrocarbyl containing phosphorus, nitrogen, sulfur and/or oxygen $R_6$, $R_7$, $R_8$, $R_9$ = hydrogen, $C_1$ to about $C_{100}$ hydrocarbyl, or hydrocarbyl containing phosphorus, nitrogen, sulfur and/or oxygen.

15. The composition of claim 13 wherein said aminodiol has the following generalized structure:

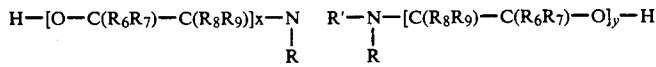

Where
x+y≧2,

R, R' = $C_1$ to about $C_{100}$ hydrocarbyl, or $C_1$ to about $C_{100}$ hydrocarbyl, or hydrocarbyl containing phosphorus, nitrogen, sulfur and/or oxygen $R_6$, $R_7$, $R_8$, $R_9$ = hydrogen, $C_1$ to about $C_{100}$ hydrocarbyl, or hydrocarbyl containing phosphorus, nitrogen, sulfur and/or oxygen.

16. The composition of claim 13 wherein comonomer (1) is an aminodiol derived from a primary or bis-secondary amine or mixtures thereof and an epoxide or mixture thereof.

17. The composition of claim 16 wherein the aminodiol is derived from piperazine, and 1,2-epoxyoctadecane.

18. The composition of claim 16 wherein the aminodiol is derived from hydrogenated tallow amine and 1,2epoxyoctadecane.

19. The composition of claim 16 wherein the aminodiol is derived from n-octyl amine and 1,2-epoxyoctadecane.

20. The composition of claim 16 wherein the aminodiol is derived from tallow amine and ethylene oxide.

21. The composition of claim 13 wherein said minor amount comprises oligomers/polymers derived from benzophenone tetracarboxylic dianhydride partial ester and aminodiol having the following generalized structure:

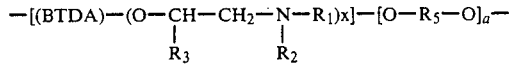

where:
$R_1$, $R_3$ = $C_8$ to about $C_{50}$ linear hydrocarbyl groups, either saturated or unsaturated,
$R_2$ = $R_1$, $C_1$ to about $C_{100}$ hydrocarbyl, or $C_1$ to about $C_{100}$ hydrocarbyl containing phosphorus, nitrogen, sulfur and/or oxygen,
$R_5$ = amine-containing sub-structure of the aminodiol(s) defined above,
x = 0.5 to about 3.5,
a = 0.25 to about 2.

22. The composition of claim 13 comprising oligomers/polymers derived from benzophenone tetracarboxylic dianhydride mixed partial ester and aminodiol having the following generalized structure:

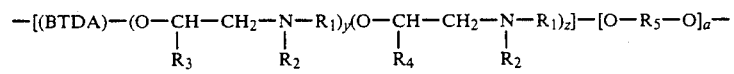

where:
$R_1$, $R_3$ = $C_8$ to about $C_{50}$ hydrocarbyl groups,
$R_2$ = $R_1$, $C_1$ to about $C_{100}$ hydrocarbyl, or hydrocarbyl containing phosphorus, nitrogen, sulfur and/or oxygen,
$R_4$ = hydrogen, $C_1$ to about $C_{100}$ hydrocarbyl, or $C_1$ to about $C_{100}$ hydrocarbyl containing phosphorus, nitrogen, sulfur and/or oxygen,
$R_5$ = amine-containing sub-structure of said aminodiol(s),
y+z = 0.5 to about 3.5,
a = 0.25 to about 2.

23. The composition of claim 13 comprising oligomers/polymers derived from benzophenone tetracarboxylic dianhydride partial ester/amide and aminodiol having the following generalized structure:

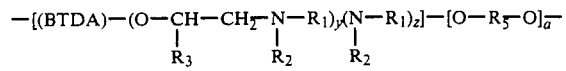

where:
$R_1$, $R_3$ = $C_8$ to about $C_{50}$ hydrocarbyl groups,
$R_2$ = $R_1$, $C_1$ to about $C_{100}$ hydrocarbyl, or $C_1$ to about $C_{100}$ hydrocarbyl containing phosphorus, nitrogen, sulfur and/or oxygen.
$R_5$ = $C_1$ to about $C_{100}$ amine-containing sub-structure of the aminodiol(s),
y+z = 0.5 to about 3.5,
a = 0.25 to about 2.

24. The composition of claim 13 where the liquid hydrocarbon combustible fuel is a distillate fuel.

25. The composition of claim 24 where the distillate fuel is selected from fuel oils.

26. The composition of claim 25 where the fuel oils are selected from heating fuel oil Nos. 1, 2 and 3 and diesel fuel oils.

27. The composition of claim 26 where the fuel oil is a heating fuel oil.

28. The composition of claim 26 where the fuel oil is a diesel fuel oil.

29. The composition of claim 13 where the minor amount comprises from about 0.01% to about 5 wt % based on the total weight of the composition.

30. A process for preparing an additive product of reaction suitable for use in fuel compositions by reacting under esterification conditions at temperatures varying from 80° to about 250° C. in molar ratios, less than molar ratios and more than molar ratios comonomers comprising (1) an aminodiol or combination or mixture of aminodiols and (2) a reactive acid/anhydride product alone or in combination with other such monomer products derived from the reaction of benzophenone tetracarboxylic dianhydride or its acid equivalent with (a) an aminoalcohol, the product of an amine and an epoxide.

31. The process of claim 30 wherein the comonomers are combined under esterification conditions in accordance with the following stepwise procedure:

-continued

1. BTDA + HO—CH—CH$_2$—N—R$_1$ +
                 |         |
                 R$_3$     R$_2$ optionally H—N—R$_1$ ⟶ Reactive Acid/Anhydride
            |
            R$_2$ 2. Reactive Acid/Anhydride + HO—R$_5$—HO ⟶

Oligomer/Polymer where
HO-R$_5$-OH = aminodiol(s)
R$_1$, R$_3$ = C$_8$ to about C$_{50}$ hydrocarbyl groups,
R$_2$ = C$_1$ to about C$_{100}$ hydrocarbyl, C$_1$ to about C$_{100}$ hydrocarbyl containing phosphorus, nitrogen, sulfur and/or oxygen or R$_1$
R$_5$ = C$_1$ to about C$_{100}$ amine-containing hydrocarbyl sub-structure of said aminodiol(s).

32. The process of claim 31 wherein the aminodiol is derived from a primary amine and an epoxide has the following generalized structure:

H—[O—C(R$_6$R$_7$)—C(R$_8$R$_9$)]x—N—[C(R$_8$R$_9$)—C(R$_6$R$_7$)—O]$_y$—H
                                       |
                                         R where
x + y ≧ 2
R, R' = C$_1$ to about C$_{100}$ hydrocarbyl, or C$_1$ to about C$_{100}$ hydrocarbyl, or hydrocarbyl containing phosphorus, nitrogen, sulfur and/or oxygen
R$_6$, R$_7$, R$_8$, R$_9$ = hydrogen, C$_1$ to about C$_{100}$ hydrocarbyl, or hydrocarbyl containing phosphorus, nitrogen, sulfur and/or oxygen.

33. The process of claim 31 wherein the aminodiol is derived from a bis-secondary amine and an epoxide and has the following generalized structure:

H—[O—C(R$_6$R$_7$)—C(R$_8$R$_9$)]x—N—R'—N—[C(R$_8$R$_9$)—C(R$_6$R$_7$)—O]$_y$—H
                                       |        |
                                       R      R where
x + y ≧ 2
R, R' = C$_1$ to about C$_{100}$ hydrocarbyl, or C$_1$ to about C$_{100}$ hydrocarbyl, or hydrocarbyl containing phosphorus, nitrogen, sulfur and/or oxygen
R$_6$, R$_7$, R$_8$, R$_9$ = hydrogen, C$_1$ to about C$_{100}$ hydrocarbyl, or hydrocarbyl containing phosphorus, nitrogen, sulfur and/or oxygen.

34. The process of claim 31 wherein the oligomers/polymers derived from the benzophenone tetracarbox- ylic dianhydride mixed partial ester and aminodiol have the following generalized structure:

—[(BTDA)—(O—CH—CH$_2$—N—R$_1$)$_y$(O—CH—CH$_2$—N—R$_1$)$_z$]—[O—R$_5$—O]$_a$—
                     |           |          |           |
                     R$_3$      R$_2$      R$_4$      R$_2$

Where:
R$_4$ = hydrogen, C$_1$ to about C$_{100}$ hydrocarbyl, or C$_1$ to about C$_{100}$ hydrocarbyl containing phosphorus, nitrogen, sulfur and/or oxygen.
y + z = 0.5 to about 3.5,
a = 0.25 to about 2.

35. The process of claim 31 wherein the oligomers/polymers derived from the benzophenone tetracarboxylic dianhydride partial ester/amide and aminodiol have the following generalized structure:

—[(BTDA)—(O—CH—CH$_2$—N—R$_1$)$_y$(N—R$_1$)$_z$]—[O—R$_5$—O]$_a$—
                     |          |         |
                  R$_3$     R$_2$     R$_2$ where:
y + z = 0.5 to about 3.5
a = 0.25 to about 2.

36. The process of claim 31 wherein the oligomers/polymers derived from benzophenone tetracarboxylic dianhydride partial ester and aminodiol have the following generalized structure:

—[(BTDA)—(O—CH—CH$_2$—N—R$_1$)x]—[O—R$_5$—O]$_a$—
                 |          |
               R$_3$    R$_2$ where
x = 0.5 to about 3.5
a = 0.25 to about 2.

37. The process of claim 30 wherein the aminodiol is prepared from hydrogenated tallow amine and 1,2-epoxyoctadecane.

38. The process of claim 30 wherein the aminodiol is prepared from piperazine and 1,2-epoxyoctadecane.

39. The process of claim 30 wherein the aminodiol is prepared from tallow amine and ethylene oxide.

40. The process of claim 30 wherein the aminodiol is prepared from octylamine and 1,2-epoxyoctadecane.

41. A concentrate solution comprising about 50 ml total volume suitable for use in preparing liquid hydrocarbyl fuels consisting of about 10 g of an additive product of reaction as described in claim 1 dissolved in an inert solvent.

42. The concentrate of claim 41 wherein the solvent is xylene or a mixture of xylenes.

43. A method of improving the low temperature characteristics of liquid hydrocarbyl distillate fuels comprising blending a minor amount of about 0.0001% to about 10 wt % of an additive product as described in claim 1 with a major amount of said fuel.

* * * * *